US005314967A

United States Patent [19]

Hergenrother et al.

[11] Patent Number: 5,314,967

[45] Date of Patent: May 24, 1994

[54] PROCESS AND ISOMERIZING AGENT FOR ISOMERIZING PARTIALLY HYDROGENATED DIENE POLYMERS

[75] Inventors: William L. Hergenrother; John M. Doshak, both of Akron, Ohio

[73] Assignee: Bridgestone/Firestone, Inc., Akron, Ohio

[21] Appl. No.: 111,359

[22] Filed: Aug. 24, 1993

[51] Int. Cl.$^5$ ............................................. C08F 8/00
[52] U.S. Cl. .................................. 525/337; 525/332.8; 525/332.9; 525/333.1; 525/333.2; 525/338; 525/339; 525/340; 525/366
[58] Field of Search .......................... 525/337, 338, 339

[56] References Cited

U.S. PATENT DOCUMENTS

| | | |
|---|---|---|
| 3,312,752 | 4/1967 | Schleimer ........................ 525/332.8 |
| 3,525,729 | 8/1970 | Gaeth . |
| 3,642,658 | 2/1972 | Allum et al. . |
| 3,789,090 | 1/1974 | Otsuki et al. ...................... 525/333.2 |
| 3,983,183 | 9/1976 | Kampf .............................. 525/333.2 |
| 4,012,566 | 3/1977 | Zelinski et al. ................... 525/332.8 |
| 4,207,409 | 6/1980 | Ladenberger et al. . |
| 4,496,613 | 1/1985 | Zagefka et al. ................... 525/333.2 |
| 4,990,573 | 2/1991 | Andreossi et al. ................ 525/333.2 |

*Primary Examiner*—Bernard Lipman
*Attorney, Agent, or Firm*—Frank J. Troy, Sr.

[57] ABSTRACT

A process for producing isomerized partially hydrogenated diene polymers containing unsaturation in endo and exo trisubstituted chain configurations while substantially eliminating the unsaturation in the 1,4-trans configuration remaining after hydrogenation, by isomerizing the unsaturation in the presence of a phosphine, borane, or alkali alkoxide isomerizing agent.

10 Claims, No Drawings

PROCESS AND ISOMERIZING AGENT FOR ISOMERIZING PARTIALLY HYDROGENATED DIENE POLYMERS

FIELD OF THE INVENTION

The present invention relates to a process for obtaining endo and exo chain trisubstituted unsaturation while essentially eliminating 1,4-trans configuration backbone unsaturation in partially hydrogenated diene polymers and copolymers containing diene monomer contributed units and to the resultant polymers and copolymers formed by the process.

BACKGROUND OF THE INVENTION

Polymers prepared from conjugated dienes such as 1,3-butadiene are highly unsaturated containing both backbone and pendent unsaturation. The backbone unsaturation of polybutadiene is in the 1,4-trans- or 1,4-cis-configuration and the pendent unsaturation is in the 1,2-butadiene units, hereinafter referred to as either 1,2-microstructure or vinyl configuration. It is frequently desirable to reduce by hydrogenation the unsaturation in polybutadiene or other conjugated diene containing polymers to increase the stability of the polymer or to alter the chemical and physical characteristics of the polymer. Previous processes for hydrogenating polybutadienes or other diene containing polymers preferentially hydrogenated pendent unsaturated groups prior to hydrogenation of backbone unsaturation. It was thus impossible to produce partially hydrogenated polybutadiene having pendent unsaturation and a saturated backbone according to the processes of the prior art as disclosed in U.S. Pat. No. 4,207,409 to Ladenberger et al.

It is highly desirable to produce polymers from conjugated dienes such as polybutadiene having a substantially saturated backbone while creating non-backbone unsaturation for subsequent cross-linking. Such a polymer would be readily curable but would not be easily degraded along the backbone by oxygen or ozone, thus enabling the cured polymer to retain its cured properties.

SUMMARY AND OBJECTS OF THE INVENTION

It has been discovered that certain arylphosphine, borane or alkali alkoxide compounds having the structural formulas: $APR_2(R_3)$, $R_1BR_2(R_3)$, and $MeOR_4$ : wherein A is an aryl radical; $R_1$, $R_2$ and $R_3$ are independently hydrogen or organic radicals containing from 1 to 20 carbon atoms, including alkyl, cycloalkyl, aryl or combinations of such groups such as aralkyl; Me is Li, Na or K, and $R_4$ is $C_5$ to $C_{20}$ alkyl or cycloalkyl hydrocarbon; can be used to isomerize 1,4-trans configuration into endo and exo chain trisubstituted unsaturation of partially hydrogenated diene polymers or copolymers containing conjugated 1,3-diene monomer contributed units after hydrogenation with known hydrogenation catalysts. The isomerized partially hydrogenated polymers produced according to the process of the present invention contain endo and exo chain trisubstituted unsaturation but contain less than one percent of the diene monomer contributed units possessing 1,4-trans configuration.

It is an object of the present invention to provide an isomerization process to isomerize diene contributed units containing adjacent 1,4-trans configuration and saturated vinyl configuration after hydrogenation of conjugated diene polymers and copolymers to produce polymers and copolymers having cure sites attached directly to a carbon atom in the main chain backbone.

It is a further object of the present invention to produce hydrogenated diene polymers or copolymers having conjugated 1,3-diene contributed units having 1 to 10 percent of total unsaturation but less than 1 percent of the total unsaturation being present in a 1,4-trans, 1,4-cis, and 1,2-vinyl configurations.

DETAILED DESCRIPTION OF THE INVENTION

As is well known, polymers can be prepared by polymerizing diolefins alone or with one or more unsaturated monomers. Such polymers may be prepared in solution using anionic initiators. These polymers are hydrogenated to remove unsaturation. It is also well known that butadiene or other dienes polymerize into a variety of monomer contributed unit configurations including vinyl configuration (1,2-microstructure), 1,4-trans configuration and 1,4-cis configuration. During normal hydrogenation of diene polymers, 1,4-cis configuration and vinyl configuration are preferentially hydrogenated over 1,4-trans configuration units due to reduced steric hinderance.

The process of the present invention is performed after a standard hydrogenation process to isomerize the diene monomer contributed units having a saturated vinyl and an unsaturated 1,4-trans configuration into endo or exo chain trisubstituted unsaturation. The present isomerization process occurs only when a saturated 1,2-vinyl configuration is present and adjacent to 1,4-trans configuration or an unsaturated vinyl configuration. Thus, if vinyl configuration is saturated by partial hydrogenation and is adjacent to a 1,4-trans configuration as shown in formula (1):

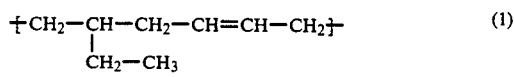

these two adjacent configurations are isomerized by the present process so that isomerization produces a mixture of endo unit chain trisubstituted unsaturation as represented by the structure:

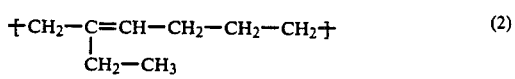

and exo unit chain trisubstituted unsaturation as represented by the structure:

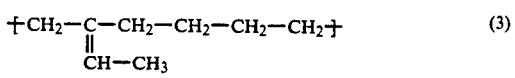

Two adjacent saturated and unsaturated 1,2-butadiene units as shown in formula (4):

are isomerized to produce a mixture of units containing endo configuration as shown in formula (5) and exo configuration as shown in formula (6):

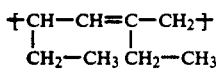 (5)

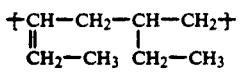 (6)

The present process is used to isomerize partially hydrogenated diene contributed units after partial hydrogenation has occurred. It must be understood that since unsaturation in 1,4-cis configuration and pendent vinyl configuration are preferentially hydrogenated over 1,4-trans unsaturation; essentially only the unsaturation in 1,4-trans configuration remains to be isomerized. Thus, isomerization takes place along the polymer chain only where an unsaturated 1,4-trans configuration diene monomer contributed unit is adjacent to a saturated vinyl configuration diene contributed unit or if a vinyl configuration remains unsaturated after partial hydrogenation and is adjacent to a saturated 1,2-vinyl configuration to produce either endo units as displayed in formula (2) or exo units as displayed in formula (3).

It is only known that the present isomerization process produces a mixture of endo and exo configurations in diene polymers, however, the ratio of endo to exo configurations produced is unknown.

The presence of the endo and exo units in the isomerized partially hydrogenated diene polymers thermodynamically stabilizes the polymers due to the presence of a trisubstituted carbon atom in each unit. The isomerized unsaturation has an increased number of allyl groups which are used for curing. The presence of curable unsaturation in the exo group containing a trisubstituted carbon atom contributes units to a polymer or copolymer which are both easily curable and highly stable against oxidation. The presence of units having endo configuration stabilizes the resultant polymer against oxidation since the unsaturation in the endo configuration is more thermodynamically stable and less subject to oxidation than the unsaturation in a 1,4-trans configuration. The reduced steric hinderance of both types of trisubstituted unsaturation increases the stability of polymers containing such unsaturation against oxygen and heat degradation.

The polymers to be hydrogenated and subsequently isomerized by the process of the present invention are selected from homopolymers of butadiene or other conjugated dienes such as isoprene, 2,3-dimethylbutadiene, piperylene and the like and copolymers formed from at least 50 parts by weight of conjugated diene monomers and 50 or less parts by weight of ethylenically unsaturated monomers including monovinylidene aromatic hydrocarbons such as styrene (o-, m- and p-) and alkylstyrenes; and vinylpyridine. Homopolymers, random copolymers, block copolymers and graft copolymers can be hydrogenated and isomerized according to the process of the present invention. The terms "diene polymer" used heretofore and hereinafter means all of the aforementioned polymers or copolymers. The percent of unsaturation refers to the percentage of diene monomer contributed units containing unsaturation in the total amount of diene monomer contributed units.

For the practice of the present invention it is preferred to utilize diene polymers having 30 to 90 percent of the diene monomer contributed units in a vinyl configuration and 10 to 70 percent of the diene monomer contributed units in a 1,4-trans and/or 1,4-cis configuration prior to partial hydrogenation. After these diene polymers are isomerized after hydrogenation the remaining unsaturation in vinyl, 1,4-trans and 1,4-cis configuration is less than two percent, preferably less than one percent.

These diene polymers may have number-average molecular weights of from 1,000 to 1,000,000 and are preferably prepared by known anionic solution polymerization techniques using organo-metallic catalysts, for example catalysts based on sodium, potassium, lithium, especially lithium alkyls.

Any solvent which does not adversely affect the catalyst and can dissolve the diene polymer to be hydrogenated may be used to provide the polymer solution. Suitable solvents include benzene, toluene, xylene, hexane, cyclohexane and tetrahydrofuran. When the polymer is prepared by a solution polymerization method, the resulting solution may be used as such for hydrogenation.

In preferred embodiment of the invention, the hydrogenation is carried out directly following the polymerization of the diene polymer, preferably in the same reaction medium, at a concentration of from 1 to 80, preferably from 1 to 40, most preferably from 15 to 25 percent by weight of polymer based on the solution.

The present invention is directed to an isomerization process for creating unsaturation in endo and exo configurations, while eliminating unsaturation in the 1,4-trans and 1,4-cis configuration in the backbone of partially hydrogenated diene polymers. The present process is used to isomerize partially hydrogenated diene polymers to shift carbon to carbon unsaturation in either the 1,2-vinyl configuration or in the 1,4-trans configuration from the polymer main chain or backbone to unsaturation in the endo or exo configuration.

It has been determined that partially hydrogenated diene polymers are isomerized to obtain unsaturation units having endo and exo configuration while substantially eliminating 1,4-trans configuration in the main chain by treating the polymers in the presence of hydrogenating catalysts after hydrogenation with an isomerizing effective amount of an arylphosphine, a borane or an alkali alkoxide isomerizing compound.

Suitable arylphosphine isomerizing compounds have the formula:

wherein A is an aryl group; and $R_2$ and $R_3$ are independently hydrogen or organic radicals containing from 1 to 20 carbon atoms, including alkyl, cycloalkyl, aryl or combinations of such groups such as aralkyl. Preferred arylphosphine compounds include triphenylphosphine, diphenylphosphine, phenyldimethylphosphine, diphenylmethylphosphine, phenylphosphine and tritolylphosphine.

Suitable borane isomerizing compounds have the formula:

wherein $R_1$, $R_2$ and $R_3$ are independently hydrogen or organic radicals containing from 1 to 20 carbon atoms, including alkyl, cycloalkyl, aryl or combinations of such groups such as aralkyl. Preferred borane compounds include dialkylboranes including di(isobutyl)borane.

Suitable alkali alkoxide isomerizing compounds have the formula:

MeOR₄ wherein M is Li, Na or K, and R₄ is an alkyl radical containing from 5 to 20 carbon atoms, including n-alkyl, iso-alkyl, t-alkyl radicals and cycloalkyl. Preferred alkali alkoxide compounds include lithium-t-amylate, potassium-t-amylate, sodium-t-amylate, potassium-t-butylcyclo-hexanol and the like.

As is known in the art, polymers from conjugated dienes can be partially hydrogenated using the following ranges of reaction conditions. It is preferable to use reaction pressures in the range from atmospheric to 200 atmospheres the usual range being within 1 to 50 atmospheres. The hydrogenation temperature can range from 20° to 200° C. with the preferred temperature range being between about 40° to 140° C. Reaction times depend upon the degree of saturation to be obtained and the amount of initial unsaturation, however reaction times are normally in the range of 0.5 to 5 hours, preferably 1 to 2 hours.

The rate of hydrogenation of the diene polymers of the present invention can be controlled by viscosity, H₂ pressure and stirring rate while the 1,4-cis, 1,4-trans and vinyl contents of the residual unsaturate is controlled by the specific hydrogenation catalyst concentration and temperature. By controlling these factors known hydrogenation catalysts systems can be selected to produce partially hydrogenated diene polymers having 1 to 50 percent of total unsaturation. In the usual case, partial hydrogenation of diene polymers to less than 10 percent unsaturation takes place after 1 or 2 hours.

In order to obtain polymers of the desired characteristics, the unsaturation should be reduced to a value of approximately 1 to 50 percent, based upon the theoretical value of 100 percent for the unhydrogenated diene contributed units in the diene polymer. After hydrogenation the residual unsaturation in the diene polymer should be preferably between 1 and 30 percent, most preferably between 1 and 10 percent of total unsaturation of the diene contributed units. The value desired within this unsaturation range depends upon the final desired use for the particular hydrogenated material.

Hydrogenation is preferably carried out in solution in an inert hydrocarbon, preferably in the same hydrocarbon solvent employed during polymerization. While any soluble hydrogenation catalyst system is acceptable for use in the present invention, hydrogenation catalysts are preferably, but not exclusively, a transition metal compound such as cesium or a Group VIII metal compound including cobalt, nickel, or iron carboxylates or alkoxides in combination with a hydrocarbon-aluminum compound as a reducing agent.

These Group VIII metal compounds which are useful as hydrogenation catalysts are well known in the art and include Ni, Fe or Co compounds that are soluble in the inert hydrocarbon solvent. Examples of suitable Group VIII metal salts include the nickel, cobalt and iron salts of hydrochloric acid, hydrobromic acid, hydroiodic acid, sulfuric acid, nitric acid, phosphoric acid, caprylic acid, capric acid, lauric acid, myristic acid, palmitic acid, stearic acid, arachidic acid, cyclobutanecarboxylic acid, cyclohexanecarboxylic acid, benzoic acid, and 2-naphthoic acid. Examples of suitable metal salts of the beta-diketones include the nickel salts of 2,4-pentanedione (acetylacetone), 3,5-heptanedione, 1,5-dicyclopentyl-2,4-pentanedione, and the like. Mixtures of the foregoing components can be used. Nickel salts of organic carboxylic acids are preferred, specifically nickel octanoate.

Any hydrocarbon-aluminum compound having the formula AlR₃, where at least one of the R's is a hydrocarbon radical, and the other R's may be hydrogen or a hydrocarbon radical can be used as the reducing component in producing the catalyst useful in accordance with this invention. Exemplary of such hydrocarbon-aluminum compounds are triethylaluminum, tri-n-propylaluminum, triisopropylaluminum, tri-n-butylaluminum, triisobutylaluminum, triamylaluminum, trihexylaluminum, trioctylaluminum, tri-2-ethylhexylaluminum, tricyclohexylaluminum, triphenylaluminum, tribenzylaluminum, diethylaluminum hydride, diisobutylaluminum hydride and the like, and mixtures of any of these aluminum compounds.

The reaction of the transition metal compound and the hydrocarbon-aluminum compound is preferably done in situ by adding either one of the catalyst components to the reactor at the beginning of the reaction, and the second catalyst component then added continuously or incrementally during the reaction, or both catalyst components may be added either continuously or incrementally throughout the hydrogenation reaction. The catalyst components may be prereacted and used for the hydrogenation reaction. This prereaction is carried out under hydrogen and the unsaturated polymer solution is then added to the catalyst. The hydrocarbon-aluminum compound and transition metal compound are generally used in a molar ratio of from about 1.3:1 to about 20:1, preferably from about 2:1 to about 10:1 and more preferably from about 3:1 to about 5:1. The amount of the catalyst used for the hydrogenation reaction may be varied over a wide range and will depend somewhat upon the hydrogenation conditions and the unsaturated diene polymer that is being hydrogenated. The amount of catalyst based on the transition metal compound is generally in the range of 0.02 to 4 gram millimoles per 100 grams of the unsaturated diene polymer being hydrogenated, and preferably will be from about 0.04 to 0.5 gram millimoles per 100 grams of polymer.

It is optional but preferable to incorporate cyclohexene into the hydrogenation catalyst to stabilize the catalyst prior to hydrogenation. Cyclohexene is preferably used in a 0.5 to 2.0/1.0 ratio to the transition metal compound.

It is also a preferred embodiment of the present invention to additionally pretreat the unsaturated diene polymer solution during hydrogenation with an arylphosphine isomerizing compound. This pretreatment with the arylphosphine isomerizing compound during hydrogenation is conducted with a molar ratio of arylphosphine isomerizing compound to transition metal compound ranging from 1:20 to 1:2.5, preferably from 1:10 to 1:3, most preferably from 1:6 to 1:4. The pretreating amount of arylphosphine isomerizing compound can be added to the polymer solution together, before or after the addition of the hydrogenation catalyst, but prior to or during hydrogenation. This pretreatment initiates isomerization prior to the post hydrogenation treatment with isomerizing compounds. It is desirable to pretreat the polymer solution in this manner in order to obtain a higher degree of isomerization during the post hydrogenation isomerization.

The partial hydrogenation of the unsaturated diene polymer is carried out with molecular hydrogen, which is advantageously introduced into the polymer solution as a gas. Hydrogen pressures of from 1 to 200 atmospheres may be used, those from 1 to 50 atmospheres being preferred. During the hydrogenation, the polymer solution is stirred vigorously so as to enable the hydrogen introduced to come sufficiently rapidly into contact with the polymer. The hydrogenation may be carried out at from 50° to 200° C., preferably from 70° to 140° C. Since the catalyst complexes are sensitive to oxygen, the process is advantageously carried out in the absence of oxygen. The hydrogenation reaction takes place very rapidly and normally the desired amount of partial hydrogenation occurs in 1 to 2 hours. The partially hydrogenated diene polymer is subsequently isomerized according to the process of the present invention.

The isomerizing compounds are generally effective in isomerizing the vinyl or 1,4-trans configuration unsaturation into endo and exo configuration unsaturation when used in a molar ratio of isomerizing compound to transition metal component from 1:10 to 10:1, preferably at least 1:4 to up to 4:1. This ratio is an isomerizing effective amount of isomerizing compound.

The isomerizing compound is added to the polymer solution and hydrogenation catalyst after the polymer has undergone hydrogenation to the desired degree of partial hydrogenation. A hydrogen atmosphere is preferably maintained over the solution during isomerization, however other inert atmospheres such as nitrogen may be utilized. The solution containing partially hydrogenated polymer, residual hydrogenation catalyst and isomerizing compound is heated to approximately 50° to 200° C. for approximately 30 minutes to 2 hours to affect isomerization.

The partially hydrogenated and isomerized polymers can be recovered by any well known technique such as coagulation, removal of the diluent by evaporation, or the like. Catalyst residues can be separated from the polymer by well known methods.

During prior art hydrogenation processes it was typically observed that vinyl side groups undergo more rapid hydrogenation than double bonds along the polymer chain thus removing curing sites. Through the use of the isomerizing compounds as an isomerizing agent in the process of the present invention, isomerized partially hydrogenated diene polymers are produced having an unsaturation ratio of at least 3:1, preferably at least 5:1, most preferably at least 16:1. The unsaturation ratio is the ratio of the number of carbon to carbon unsaturation groups present in the endo and exo configurations to the number of unsaturation groups present in 1,4-trans, 1,4-cis and vinyl configurations in the diene contributed units in the hydrogenated and isomerized diene polymers. The process of the present invention can provide hydrogenated diene polymers and copolymers having 1 to 30 percent, preferably 1 to 10 percent of total unsaturation in the diene monomer contributed units but less than 2 percent, preferably less than 1 percent of unsaturation in the 1,4-trans configuration in the polymer backbone or main chain.

The product resulting from the present isomerization process may be examined by infrared analysis to determine the presence of unsaturation in the 1,4-trans, 1,4-cis and vinyl configurations. In the usual infrared analysis, any 1,4-trans structure will show strong absorbance at 10.35 microns, while any 1,4-cis structures will show absorbance at 13.60 microns. The vinyl structure shows absorbance at two-wave lengths, namely, 10.98 and 10.05 microns. It is desirable in the final product that substantially no unsaturation as measured by IR be present, that is, less than 1 percent, preferably, less than 0.5 percent, and that all the IR unsaturation be present in the 1,4-trans configuration after the product is isomerized. In the products of most commercial utility, the isomerized products will usually have from 1 to 10 percent unsaturation as measured by iodine titration, preferably 2 to 8 percent unsaturation, most preferably 3 to 5 percent unsaturation.

The curable, heat and oxygen stable elastomeric products produced according to the present invention are useful as plastics raw material in the rubber industry, and as the soft component in compounding high-impact thermoplastics.

The advantages of this invention are further illustrated by the following example. The reactants and their proportions and other specific conditions are presented as being typical and should not be construed to limit the invention unduly.

EXAMPLE 1

(a) Preparation of polymer

A polybutadiene polymer (PBD) containing 62% of 1,2-microstructure was prepared in hexane solution (17.8% by weight of polymer) utilizing catalyst system of oligomeric oxolanyl propane (OOPS) and n-butyllithium. The live polymer was terminated with alcohol and the polymer cement stored in a 0.5 gal reactor under nitrogen to be used for subsequent hydrogenation reactions.

(b) Preparation of hydrogenation catalyst

The catalyst was prepared in a $CCl_4$ dry ice bath at $-25°$ C. by sequentially charging a 10 oz. bottle with 2.25 cc of a dry hexane solution containing 0.9 mM of nickel octonate and 0.9 mM of cyclohexene followed by adding 2.7 mm of molar triisobutyl aluminum.

(c) Hydrogenation (1) Control polymer (comparative example)

Hydrogenation was carried out in a clear $H_2$ purged reactor heated to 67° C. and charged with 2022 gm of polybutadiene cement (360 gm of PBD). The catalyst was added to the reactor together with 50 cc of hexane. The $H_2$ pressure of was increased to 150 psi through a bottom spare tube. Repressurization with $H_2$ to 150 psi was done after each 100 psi reduction for the first two pressure drops and then after each subsequent 50 psi drop. After approximately one hour no further repressurization was necessary. The reactor was allowed to heat for three hours in total before a sample of the polymer was removed by adding isopropanol containing 3 cc of concentrated HCl and 1.8 g of Irganox 1076 and drum dryed. The recovered control polymer possessed properties displayed in Table 1 as Control A.

The unsaturation ratio as displayed in the last column of Table 1 shows the ratio of diene monomer contributed units in the polymers containing either an endo and exo configuration to the remaining total of 1,4-trans, 1,4-cis or 1,2-vinyl configuration in diene monomer contributed units of the polymer. The unsaturation ratio is determined by averaging the total unsaturation of the polymer as determined by Iodine Titration and by Proton NMR, and then subtracting the percentage of unsaturation as determined by Infrared Spectroscopy, and then dividing this quotient by the percentage of unsaturation as determined by Infrared Spectroscopy.

(d) Hydrogenation and Pretreatment with Arylphosphine

Polybutadiene was hydrogenated in accordance with the procedure in Example 1 - c(1) except triphenylphosphine (0.23 millimoles) in 5 cc of toluene was added to the reaction before the triisobutyl aluminum. The recovered hydrogenated polymer was white and rubbery and displayed the properties shown in Table 1 as Control B.

(e) Hydrogenation In Absence of Arylphosphine and Post Treatment with Arylphosphines A hydrogenation catalyst was prepared in accordance with Example 1 (b) however 3.6 mM of triisobutyl aluminum was substituted for the previously recited amount. The hydrogenation catalyst was charged into the reactor at 67° C. with 50 cc of hexane and the pressure in the reactor was increased to 150 psi with $H_2$. Repressurization with $H_2$ to 150 psi was done after each 100 psi pressure drop for the first two pressure drops and then after each subsequent 50 psi drop during the first hour after which time the $H_2$ uptake was ceased. After three hours from the initial $H_2$ pressurization a polymer sample (Control C) was taken. The unsaturation properties of the comparative polymer (Control C) are shown on Table 1.

EXAMPLES 2-5

A hydrogenated polymer was produced in accordance with the procedures of Example 1 to prepare control polymer A. In Example 2, no pretreatment with triphenylphosphine during hydrogenation was performed. Post-hydrogenation isomerization was conducted by adding 0.9 MM of triphenylphosphine to the polymer solution and heating the polymer solution under hydrogen.

In Examples 3 to 5, the diene polymer was pretreated with 0.23 mM of triphenylphosphine in addition to the hydrogenation catalyst during hydrogenation according to the above procedure. Post-hydrogenation isomerization was conducted in Example 3 with 0.9 MM of triphenylphosphine as in Example 2. Post-hydrogenation isomerization was conducted in Example 4 by adding 0.23 MM of triphenylphosphine, 0.9 mM of nickel octanate and 2.7 MM of triisobutylaluminum.

In Example 5, the post-hydrogenation isomerization step was conducted by adding 0.23 mM of triphenylphosphine, 0.9 mM of cobalt octanate and 2.7 mM of triisobutylaluminum to the hydrogenated mixture.

The unsaturation properties of the recovered isomerized polymer products of Examples 2 to 5 and the molar ratio of isomerizing compound to nickel hydrogenation catalyst are displayed in Table 2. The temperatures identified in Table 2 represent the maximum temperature reached during the exothermic isomerization reactions.

EXAMPLES 6-16

Post Hydrogenation Isomerization with Borane Isomerizing Compounds

A 0.5 gallon reactor was charged with 2020 g. (360 g of polymer) of the polybutadiene solution of section (a) of Example 1 and purged with $H_2$ through a bottom sparge valve.

A hydrogenation catalyst was prepared in accordance with section (d) of Example 1. The hydrogenation catalyst was charged into the reactor at 67° C. with 50 cc of hexane and the pressure in the reactor was increased to 150 psi with $H_2$. Repressurization with $H_2$ to 150 psi was done after each 100 psi pressure drop for the first two pressure drops and then after each subsequent 50 psi drop during the first hour after which time the $H_2$ uptake was ceased. After three hours from the initial $H_2$ pressurization a polymer sample (6a) was taken and quenched in isopropanol containing HCl. A solution of 0.9 mM of di(isobutyl)BH with 50 cc of hexane was added to the remaining polymer. The reactor was maintained at 77° C. under 150 of $H_2$ for one hour and the polymer was recovered as in the procedure of Example 1. Table 3 displays the unsaturation properties of the recovered isomerized polymer of Example 6 and the precursor hydrogenated polymer sample as Example 6(a).

Examples 7 to 14 were performed in accordance with the procedure of Example 6, likewise having 0.23 mM of triphenylphosphine added to the hydrogenation catalyst system prior to partial hydrogenation of the diene polymer solution to preisomerize the polymer during hydrogenation. Example 7 was hydrogenated in the presence of 0.9 mM nickel octanate and 3.6 MM of tributyl aluminum.

In Examples 12 to 14 the diene polymer solution was hydrogenated in the presence of the isomerizing compounds identified in Table 3. An additional identical charge of these isomerization compounds was made after hydrogenation and the maximum temperature reached during the isomerization reaction is identified in Table 3. Post-hydrogenation isomerization was then performed for Examples 7 to 14, according to the procedure of Example 6, utilizing the isomerization compounds identified in Table 3 in place of di(isobutyl)borane. The properties of the recovered isomerized polymers and the molar ratio of isomerizing compound to nickel hydrogenation catalyst are displayed in Table 3.

Table 3 displays the unsaturation properties of the polymers recovered after the first hydrogenation step as Examples 7(a) to 14(a), and then again, after the post-hydrogenation isomerization step as Examples 7 to 14, respectively.

Example 15 was performed with the catalyst of Example 1(b) in accordance with the procedure of Example 6, utilizing a 50:50 mixture of tri(isobutyl)borane and borane in tetrahydrofuran (THF), as the post-hydrogenation isomerizing compound. No isomerizing compound was used during hydrogenation. In Table 3 the properties of the polybutadiene after hydrogenation are displayed as Example 15(a) and the properties of the isomerized and hydrogenated polybutadiene are displayed as Example 15.

EXAMPLES 16 AND 17

Post Hydrogenation Isomerization with Alkali Alkoxides

Example 16 was performed in accordance with the procedures of Examples 7 to 14, however, 0.9 mM of potassium tert-amylate was used as the post hydrogenation isomerizing compound instead of a borane compound. Example 16 utilized 0.9 mM of nickel octanate, 3.6 mM of tributylaluminum, 0.9 mM of cyclohexene and 0.23 MM of triphenylphosphine during hydrogenation. Example 17 was performed identically to Example 16, however, only 2.7 MM of tributylaluminum was utilized during hydrogenation, however, all of the hydrogen was vented and replaced with nitrogen prior to the addition of the potassium-t-amylate. The unsaturation properties of the hydrogenated polybutadiene prior to the post hydrogenation isomerization are displayed in Table 3 as Examples 16 (a) and 17 (a), while the properties of the post-hydrogenated isomerized polybutadienes are displayed as Examples 16 and 17, respectively.

TABLE 1

| Example No. | Total % 1,4-trans, 1,4-cis and vinyl configuration[1] (a) | Total Unsaturation % by $I_2$[3] by Proton[4] | | Unsaturation Ratio [0.5(b + c) − a]/a |
|---|---|---|---|---|
| | | Titration (b) | NMR (c) | |
| Control A | 1.5 (1.44)[2] | 6.9 | 4.3 | 2.84 |
| Control B | 0.2 (0.2)[2] | 4.3 | 2.6 | 16.33 |
| Control C | 1.9 (0.98)[2] | 6.8 | 4.9 | 4.01 |

[1]The total percent of the combined 1,4-trans, 1,4-cis and vinyl configuration content of the polymer remaining after hydrogenation and isomerization as determined by Infrared Spectroscopy as shown in column (a).
[2]The 1,4-trans configuration percentage only remaining after hydrogenation and isomerization.
[3]Total unsaturation percentage (1,4-trans, 1,4-cis, vinyl, endo and exo configurations as determined by Iodine Titration).
[4]Total unsaturation pecentage as determined by Proton NMR.

TABLE 2

| Example No. | Isomerizing Compound (I.C.) | Ni/I.C. | Temp (°F.) | % trans | % Unsaturation IR | % Unsaturation $I_2$ | % Unsaturation NMR | Unsat. Ratio |
|---|---|---|---|---|---|---|---|---|
| 2 | Ph$_3$P | 1.0 | 205 | 100 | 0.7 | 6.2 | 3.1 | 5.63 |
| 3 | Ph$_3$P | 1.0 | 213 | 100 | 0.1 | 3.8 | 2.5 | 30.3 |
| 4 | Ph$_3$P | 4.0 | 215 | 100 | 0.1 | 3.4 | 0.9 | 20.7 |
| 5 | Ph$_3$P | 4.0 | 201 | 100 | 0.1 | 2.4 | 1.0 | 27.42 |

TABLE 3

| Example No. | Isomerizing Compound (I.C.) | Ni/I.C. | Temp (°F.) | % trans | % Unsaturation IR | % Unsaturation $I_2$ | % Unsaturation NMR | Unsat. Ratio |
|---|---|---|---|---|---|---|---|---|
| 6 | (isobutyl)$_2$BH | 1.0 | 194 | 95.5 | 0.3 | 2.9 | 2.4 | 12.20 |
| 6(a) | | | | 57.0 | 0.9 | 3.3 | 3.4 | 1.82 |
| 7 | (isobutyl)$_3$B | 1.0 | 214 | 100 | 0.1 | 3.2 | 1.7 | 33.79 |
| 7(a) | | | | 48.6 | 0.3 | 3.4 | 2.0 | 16.43 |
| 8 | BH$_3$.THF | 1.0 | 217 | 100 | 0.1 | 4.3 | 1.6 | 28.5 |
| 8(a) | | | | 51.7 | 0.4 | 5.1 | 2.0 | 15.3 |
| 9 | (isobutyl)$_3$B[a] | 1.0 | 182 | 100 | 0.1 | 2.8 | 1.5 | 22.83 |
| 9(a) | | | | 24.6 | 2.7 | 7.9 | 6.5 | 2.18 |
| 10 | (isobutyl)$_2$BH | 1.0 | 194 | 95.5 | 0.3 | 2.9 | 2.4 | 12.2 |
| 10(a) | | | | 24.1 | 7.9 | 8.0 | 13.9 | 1.59 |
| 11 | BH$_3$.Ph$_3$P (1/1) | 1.0 | 215 | 100 | 0.4 | 5.3 | 1.4 | 7.31 |
| 11(a) | | | | 22.9 | 9.6 | 7.6 | 10.2 | 0.01 |
| 12 | Ph$_3$P/Co/B[b] | | 180 | 100 | 0.2 | 3.2 | 1.3 | 10.33 |
| 12(a) | | | | 39.2 | 1.2 | 2.8 | 2.8 | 3.37 |
| 13 | Ph$_3$P/Ce/B/Al[c] | | 187 | 100 | 0.4 | 3.7 | 2.3 | 6.27 |
| 13(a) | | | | 35.7 | 2.4 | 7.5 | 5.7 | 4.88 |
| 14 | Ph$_3$P/Co/B/Al[d] | | 183 | 100 | 0.3 | 3.0 | 1.2 | 5.33 |
| 14(a) | | | | 37 | 4.0 | 10.4 | 7.0 | 3.17 |
| 15 | (isobutyl)$_3$B/BH$_3$.THF | 1.0 | 188 | 100 | 0.6 | 6.7 | 3.1 | 7.17 |
| 15(a) | | | | 74.3 | 1.1 | 6.6 | 3.6 | 4.86 |
| 16 | KO-t-Amylate | 1.0 | 185 | 100 | 0.6 | 3.2 | 1.8 | 5.05 |
| 16(a) | | | | 46.8 | 2.1 | 5.3 | 3.8 | 2.51 |
| 17 | KO-t-Amylate | 1.0 | 195 | 100 | 0.1 | 3.2 | 1.9 | 27.22 |
| 17(a) | | | | 22.8 | 4.4 | 8.3 | 7.0 | 3.30 |

[a]All of the hydrogen present in the reactor was vented with this addition and replaced with nitrogen.
[b]This consisted of 2.7 mM of Ph$_3$P, 0.9 mM of Co(dioctonate) and 0.9 mM of BH$_3$.THF.
[c]This consisted of 0.225 mM of Ph$_3$P, 0.9 mM of Ce(trioctonate), 0.90 mM of BH$_3$.THF and 2.70 mM of IBu$_3$Al.
[d]Same as (c) except the Ce compound was replaced with Co(dioctonate).

What is claimed is:

1. A process for isomerizing a solution of partially hydrogenated diene polymer containing at least 50 percent by weight of diene monomer contributed units and 0 to 50 percent by weight of ethynically unsaturated monomer contributed units in an inert organic solvent in the presence of a soluble hydrogenation catalyst comprising admixing an isomerizing effective amount of a borane compound having the formula:

$$R_1BR_2(R_3)$$

wherein $R_1$, $R_2$ and $R_3$ are independently selected from the group consisting of H and alkyl, cycloalkyl and aryl groups containing 1 to 20 carbon atoms and combinations thereof;
to the solution and heating the solution to isomerize the diene monomer contributed units of the partially hydrogenated diene polymer to produce a diene polymer having an unsaturation ratio of at least 3 to 1, said unsaturation ratio being defined as a ratio of a combined total of unsaturation groups in the diene monomer contributed units in an endo and an exo configuration to a combined total of unsaturation groups in the diene monomer contributed units in a 1,4-cis, 1,4-trans and vinyl configuration.

2. The process of claim 1 wherein the hydrogenation catalyst comprises an a Group VIII metal compound and an organo-aluminum compound.

3. The process of claim 1 wherein the hydrogenation catalyst comprises an organo-nickel compound and an organo-alkyl compound.

4. The process of claim 1 wherein the hydrogenation catalyst comprises a nickel salt of an organic carboxylic acid, trialkyl aluminum and cyclohexene.

5. The process of claim 1 wherein the diene polymer is polybutadiene.

6. The process of claim 1 wherein the diene polymer is a styrene-butadiene copolymer.

7. The process of claim 1 wherein the partially hydrogenated diene polymer contains between 1 to 30 percent of total unsaturation in diene monomer contributed units after isomerization.

8. The process of claim 1 wherein the solution of partially hydrogenated diene polymer is pretreated with an arylphosphine isomerizing compound during hydrogenation.

9. The process of claim 1 wherein the solution is heated during isomerization at a temperature ranging from about 20° C. to 200° C.

10. The process of claim 1 wherein the solution is heated during isomerization under a H$_2$ atmosphere.